United States Patent [19]

Peccoux et al.

[11] Patent Number: 5,070,132

[45] Date of Patent: Dec. 3, 1991

[54] TWO-PACKAGE RTV ORGANOPOLYSILOXANES COMPRISING A WATER-RETAINING POLYMER

[75] Inventors: Pierre-Michael Peccoux, Lyons; Gilbert Schorsch, Colombes, both of France

[73] Assignee: Rhone-Poulenc Chimie, Courbevoie, France

[21] Appl. No.: 497,663

[22] Filed: Mar. 23, 1990

[30] Foreign Application Priority Data

Mar. 23, 1989 [FR] France ................... 89 04113

[51] Int. Cl.$^5$ .................................. C08K 3/36
[52] U.S. Cl. ...................... 524/492; 524/493; 524/588; 525/100
[58] Field of Search ............... 524/588, 492, 493; 525/100

[56] References Cited

U.S. PATENT DOCUMENTS 4,725,648  2/1988  Fujimoto et al. ............... 525/100

FOREIGN PATENT DOCUMENTS 0314584  5/1989  European Pat. Off. .
2592657  7/1987  France .

Primary Examiner—Veronica P. Hoke
Attorney, Agent, or Firm—Burns, Doane, Swecker & Mathis

[57] ABSTRACT

Two-package RTV organopolysiloxane compositions are prepared from storage-stable dihydroxypolydiorganosiloxane aqueous doughs that include an effective water-retaining amount of an alkali metal acrylate and/or methacrylate polymer (hydroretainer); such doughs advantageously contain from 8% to 35% by weight of water.

13 Claims, No Drawings

TWO-PACKAGE RTV ORGANOPOLYSILOXANES COMPRISING A WATER-RETAINING POLYMER

BACKGROUND OF THE INVENTION

1. Field of the Invention

The present invention relates to novel organopolysiloxane compositions useful for the production of silicone elastomers by a so-called polycondensation reaction, and, more especially, to novel "two-component" such organopolysiloxane compositions, namely, organopolysiloxane compositions packaged in two separate packs, one including a crosslinking agent which comprises either:

(i) at least one tri- and/or tetraalkoxysilane, or (ii) the product of partial hydrolysis of at least one of the alkoxysilanes (i). Prior to actual use of such organopolysiloxane compositions, it is necessary to admix the constituents contained in the two packages and the resulting crosslinking of the total composition thus provided effects production of a silicone elastomer by a polycondensation reaction.

2. Description of the Prior Art

Such organopolysiloxane compositions that can be vulcanized at ambient temperature or, more generally, at temperatures below 60° C. are known to this art. Note particularly French Patent 2,592,657 (see pages 42 et seq.), assigned to the assignee hereof, which describes compositions of this type containing a particular tin catalyst system.

These "two-component" compositions comprise:

(1) a first pack (part No. 1) including at least:
   (a) an $\alpha,\omega$-dihydroxypolydiorganosiloxane oil or a mixture of such oils of different viscosities;
   (b) a filler, typically a pyrogenic and/or precipitated silica, advantageously treated, for example, with hexamethyldisilazane or with octamethylcyclotetrasiloxane;
   (c) a small amount of water; and (2) a second pack (part No. 2), sometimes designated a "crosslinking system", comprising, for example:
   (d) a crosslinking agent selected from among:
      (i) at least one tri- and/or tetraalkoxysilane;
      (ii) the product of partial hydrolysis of at least one of the alkoxysilanes (i);
   (e) a crosslinking catalyst;
   (g) advantageously, a triorganosiloxypolydiorganosiloxane oil and/or an organic plasticizer.

It will be appreciated that the crosslinking agent may be optionally present in part No. 1, but that it is preferably present in part No. 2.

To prepare part No. 1 from its individual components on an industrial scale, the manufacturers generally begin by producing a "dough", that is to say, homogeneously mixing the constituents (a), (b) and (c) described above, while attempting to obtain a mixture (I) containing as much water as possible, this mixture (I) having to be capable of being stored as long as possible (for example for 6 months), depending on the requirements of their customers. However, it has been found that in actual practice it was difficult for this intimate mixture (I) to contain more than 7% by weight of water because the mixture (I) experiences a demixing phenomenon over time, namely, the water in this mixture (I) begins to separate out and float on the top of it. It is then necessary to rehomogenize this mixture (I) mechanically prior to its intended end use.

To produce the part No. 1 described above, in most cases the manufacturers introduce into a mixture (II) containing, for example: a polysiloxane oil (a) described above, optionally containing other fillers such as, for example, ground quartz and a polydiorganosiloxane oil having triorganosiloxy endgroups, the mixture (I) in such amount that the part No. 1 thus obtained generally contains from 500 to 5,000 ppm (parts per million) of water by weight, preferably from 1,000 to 4,000 ppm.

Thus, it is in the manufacturers' interest that the mixture (I) or "dough" described above should contain as much water as possible without the mixture (I) undergoing the water demixing phenomenon during its storage. The formulation of such doughs containing larger amounts of water presents the advantage, for the manufacturers, of permitting the preparation and storage of smaller amounts of these doughs.

SUMMARY OF THE INVENTION

Accordingly, a major object of the present invention is the provision of improved "two-component" organopolysiloxane compositions for producing silicone elastomers that include a crosslinking agent such as described above.

Another object of the present invention is the provision of such novel organopolysiloxane compositions, from which a dough containing more than 7% by weight of water is produced.

Another object of the present invention is the provision of such novel organopolysiloxane compositions as described above, in which the weight percentage of water in the dough ranges from 8% to 35%, preferably from 10% to 30%.

Yet another object of the present invention is the provision of novel "two-component" organopolysiloxane compositions described above that can be converted into silicone elastomers having good physical and mechanical properties.

Briefly, the present invention features novel two-package organopolysiloxane compositions crosslinkable into elastomeric state after mixing of the constituents situated in the two separate packs, and which comprise:

(A) an $\alpha,\omega$-dihydroxypolydiorganosiloxane having a viscosity ranging from 50 to 1,000,000 mPa.s at 25° C.;

(B) an inorganic filler material;

(C) a small amount of water;

(D) a crosslinking agent comprising:
   (i) a silane of the formula $(R^2)_k Si(OR^1)_{4-k}$ in which the symbols $R^1$, which may be identical or different, are each a $C_1$–$C_{12}$ alkyl radical, a halogenated $C_1$–$C_{12}$ alkyl radical or a $C_3$–$C_8$ alkoxyalkylene radical; the symbol $R^2$ is a $C_1$–$C_{10}$ hydrocarbon radical and the symbol k is zero or one, or (ii) a product of partial hydrolysis of such silane (i);

(E) a catalytically effective amount of a crosslinking catalyst; and a hydroretainer comprising an alkali metal acrylate and/or methacrylate group polymer.

The present invention also features a novel process for the preparation of the subject compositions.

DETAILED DESCRIPTION OF THE PREFERRED EMBODIMENTS OF THE INVENTION

More particularly according to the present invention, the subject novel compositions comprise (A) at least one α,ω-dihydroxypolydiorganosiloxane having a viscosity ranging from 50 to 1,000,000 mPa.s at 25° C., preferably from 60 to 800,000 mPa.s at 25° C.

This α,ω-dihydroxypolydiorganosiloxane advantageously has the formula:

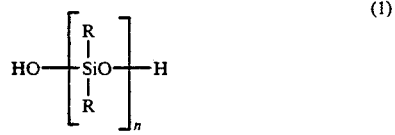

(1)

in which the radicals R, which may be identical or different, are each a monovalent hydrocarbon radical containing from 1 to 10 carbon atoms, optionally substituted by halogen atoms or cyano groups. The radicals R are preferably methyl, phenyl, vinyl or 3,3,3-trifluoropropyl radicals, and n is a number having a value such that the polysiloxane of formula (1) has a viscosity ranging from 50 to 1,000,000 mPa.s.

Exemplary radicals R include:

(i) alkyl and haloalkyl radicals containing from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

(ii) cycloalkyl and halocycloalkyl radicals containing from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals containing from 2 to 4 carbon atoms, such as vinyl, allyl and 2-butenyl radicals;

(iv) mononuclear aryl and haloaryl radicals containing from 6 to 10 carbon atoms, such as phenyl, tolyl, xylyl, chlorophenyl, dichlorophenyl and trichlorophenyl radicals; and (v) cyanoalkyl radicals, the alkyl moieties of which contain from 2 to 3 carbon atoms, such as β-cyanoethyl and -cyanopropyl radicals.

Specific examples of $R_2SiO$ units present in the alpha,omega-dihydroxydiorganopolysiloxane of formula (1) include the following:
$(CH_3)_2SiO$
$CH_3(CH_2=CH)SiO$
$CH_3(C_6H_5)SiO$
$(C_6H_5)_2SiO$
$CF_3CH_2CH_2(CH_3)SiO$
$NC-CH_2CH_2(CH_3)SiO$
$NC-CH_2CH_2(CH_2=CH)SiO$
$NC-CH_2CH_2(C_6H_5)SiO$.

It will be appreciated that the compositions of the present invention may comprise a mixture of different alpha,omega-di(hydroxy)diorganopolysiloxane polymers (1) which differ from each other in molecular weight and/or the nature the groups bonded to the silicon atoms. In addition, the polymer of formula (1) may optionally contain $RSiO_{1.5}$ monoorganosiloxy units and/or $SiO_2$ units, in a proportion of not more than 2% relative to the number of the $R_2SiO$ diorganosiloxy units. Moreover, the diorganopolysiloxane may be a homopolymer or a copolymer such that there exist, for example, various types of recurring units in the polymer chain, such as dimethyl, diphenyl, methylphenyl, etc., recurring units.

These alpha,omega-di(hydroxy)diorganopolysiloxane polymers are commercially available; in addition, they can easily be produced according to techniques which are now well known to this art.

The organopolysiloxane compositions according to the present invention comprise at least one inorganic filler (B).

These fillers can be in the form of very finely divided products whose mean particle diameter is smaller than 0.1 micrometers. Pyrogenic silicas and precipitated silicas are included among these fillers; their BET specific surface area is generally greater than 40 m²/g.

These fillers can also be in the form of more coarsely divided products, having a mean particle diameter greater than 0.1 micrometers. Examples of such fillers are ground quartz, diatomaceous silicas, calcium carbonate, calcined clay, titanium dioxide of the rutile type, iron, zinc, chromium, zirconium and magnesium oxides, the various forms of alumina (hydrated or otherwise), boron nitride, lithopone, barium metaborate, barium sulfate and ballotini; their specific surface area is generally less than 30 m²/g.

These fillers may have been surface-modified by treatment with the various organosilicon compounds typically employed for this purpose. Thus, these organosilicon compounds may be organochlorosilanes, diorganocyclopolysiloxane, hexaorganodisiloxanes, hexaorganodisilazanes or diorganocyclopolysiloxanes (French Patents 1,126,884, 1,136,885, 1,236,505; British Patent 1,024,234). In most cases, the treated fillers contain from 3% to 30% of their weight of organosilicon compounds.

The fillers may be a mixture of several types of fillers of different particle size ranges; thus, for example, they may include 30% to 70% of finely divided silicas having a BET specific surface area greater than 40 m²/g and 70% to 30% of more coarsely divided silicas having a specific surface area less than 30 m²/g.

The organopolysiloxane compositions of the present invention advantageously comprise from 5 to 125 parts by weight, preferably from 10 to 85 parts by weight, of inorganic filler(s) per 100 parts by weight of the α,ω-dihydroxypolydiorganosiloxane polymer (A).

The compositions according to the present invention also contain a small amount of water. Such amount of water typically ranges from 500 to 5,000 ppm (parts per million) by weight relative to the total weight of the composition.

The compositions according to the present invention comprise at least one crosslinking agent (D) such as described above, namely:

(i) a silane of the formula $(R^2)_kSi(OR^1)_{4-k}$ (2), or (ii) a product of the partial hydrolysis of the above silanes (i).

In this formula (2), $R^1$ is advantageously an alkyl, haloalkyl, aryl, haloaryl, alkenyl, cycloalkyl, cycloalkenyl or cyanoalkyl radical.

The radicals R may be alkyl radicals such as methyl, ethyl, propyl, isopropyl, butyl, amyl, isoamyl, octyl, isooctyl, decyl or dodecyl radicals, or haloalkyl radicals such as chlorinated, brominated or fluorinated alkyl radicals. In addition, $R^1$ may also be an aryl, aralkyl or alkenyl radical, such as vinyl, allyl, phenyl, tolyl, xylyl, benzyl, phenylethyl, naphthyl, anthracyl or biphenyl, as well as the halogen-substituted derivatives of such radicals. $R^1$ can also be a cycloalkenyl, cycloalkyl or cyanoalkyl radical.

When a product (ii) resulting from the partial hydrolysis of the silane of formula (2) is employed, a product resulting from the hydrolysis of monomeric silicate, that is to say, of a silane of formula (2) in which k is equal to 0, is preferably used.

Such products (ii) are prepared by conducting a partial hydrolysis, in water, of the particular monomeric organosilicate in the presence of small proportions of acid up to a point where it is still insoluble in water and where it is still possible to isolate a liquid compound of the partially hydrolyzed organosilicon type. Thus, ethyl silicate, which has the formula $(C_2H_5O)_4Si$, can be partially hydrolyzed by the addition of acids or of metal salts which form acids, such as $FeCl_3$, $CuCl_2$, $AlCl_3$ and $SnCl_4$, to the liquid monomeric organosilicate, followed by effecting a sufficient hydrolysis of this mixture of ingredients in water to obtain a two-phase composition from which the water-insoluble, partially hydrolyzed organosilicate can be easily separated from the aqueous phase and from the catalyst. Such a partially hydrolyzed ethyl silicate is commercially available from Union Carbide Corporation under the trademark "Ethyl Silicate-40".

In general, the silicate employed is hydrolyzed such that the liquid product obtained contains less than 10%, advantageously less than 6%, of unhydrolyzed monomeric silicate.

The products of partial hydrolysis of the silane of formula $Si(OR^1)_4$ essentially consist of recurring units of formula $(R^1O)_2SiO$, the other recurring units having the formulae $(R^1O)_3SiO_{0.5}$, $R^1OSiO_{1.5}$ and $SiO_2$.

From 1 to 15 parts (by weight), preferably from 2 to 12 parts by weight of the crosslinking agent (D) are advantageously included in the compositions according to the present invention, per 100 parts by weight of the $\alpha,\omega$-dihydroxypolydiorganosiloxane (A) having a viscosity ranging from 500 to 1,000,000 mPa.s.

Exemplary of the silanes of formula (2) are: $CH_3Si(OCH_3)_3$, $CH_3Si(OC_2H_5)_3$, $C_2H_5Si(OCH_3)_3$, $CH_2=CH\ Si(OCH_3)_3$, $CH_2=CH\ Si(OCH_2-CH_2-OCH_3)_3$, $C_6H_5Si(OCH_3)_3$, $CH_3Si(OCH_3)_2$, $OCH(CH_3)CH_2OCH_3$, $Si(OCH_3)_4$, $Si(OC_2H_5)_4$, $Si(OC_3H_7)_4$, $Si(OC_4H_9)_4$.

The organopolysiloxane compositions of the present invention also comprise at least on crosslinking catalyst (E). Among the many known catalysts which are suitable, particularly advantageous are the tin carboxylates such as tributyltin monooleate, tin 2-ethylhexanoate or dialkyltin dicarboxylates such as dibutyltin dilaurate and dibutyltin diacetate. In the text by Noll, *Chemistry and Technology of Silicones*, are reported a certain number of such catalysts (page 397, 2nd paragraph, Academic Press, 1968—2nd edition). The catalyst employed may also be a diorganotin bis($\beta$-diketonate) such as those described in French Patent No. 2,592,657 as signed to the assignee hereof. The catalyst may also be an amine, either with or without tin salt.

The catalyst is present in an amount that is catalytically effective. 0.01 to 10 parts by weight, preferably 0.1 to 8 parts by weight, are advantageously employed per 100 parts by weight of the composition according to the present invention.

The polymer (F) which serves as a hydroretainer in the organopolysiloxane compositions of the present invention consists essentially of alkali metal, especially sodium, acrylate and/or methacrylate groups.

The alkali metal (in particular sodium) acrylate polymers prepared by the process of polymerization of acrylic acid and alkali metal acrylate in aqueous suspension, such as those described especially in European Patents EP-A-36,463 and EP-A-83,022, are more particularly preferred as the polymers (F) according to the present invention.

The percentage by weight of the polymer (F) in the compositions of the present invention is advantageously greater than 0.001% and less than 5%.

Such polymers (F) are marketed by the Norsolor Company under the trademark Aqua-Keep, especially under reference 10 SH.P.

The organopolysiloxane compositions according to the present invention may optionally comprise other components, especially:

(G) an $\alpha,\omega$-triorganosiloxypolydiorganosiloxane such as, for example, an $\alpha,\omega$-trimethylsiloxypolydimethylsiloxane advantageously having a viscosity lower than 5,000 mPa.s at 25° C., and preferably ranging from 10 to 2,000 mPas. The amount of oil (G) typically ranges from 0 to 150 parts by weight, preferably from 8 to 120 parts by weight, per 100 parts by weight of the $\alpha,\omega$-dihydroxypolydiorganosiloxane polymer (A);

(H) an adhesion promoter, in a proportion of 0 to 20 parts by weight, preferably 0.2 to 15 parts by weight, per 100 parts (by weight) of the $\alpha,\omega$-dihydroxypolydiorganosiloxane polymer (A). This adhesion promoter is preferably an organosilicon compound simultaneously bearing (1) organic groups substituted by such radicals as amino, ureido, isocyanato, epoxy, alkenyl, isocyanurate, hydantoyl and mercaptoester radicals, and (2) hydrolyzable groups bonded to the silicon atoms. Such compounds are described more particularly at pages 29 and 30 of the above FR 2,592,657.

The $\alpha,\omega$-bis(triorganosiloxy)diorganopolysiloxane polymers described under (G) may be wholly or partially replaced by organic compounds which are inert towards the constituents (A), (B), (C), (D), (E) and (F) and miscible with at least the $\alpha,\omega$-di(hydroxy)diorganopolysiloxane polymers (A).

Exemplary such organic plasticizers include, in particular, petroleum cuts having a boiling point above 200° C., e.g., a mixture of aliphatic and/or aromatic hydrocarbons, polybutylenes of preferably low molecular weight, as described in French Patents FR-A-2,256,231, FR-A-2,293,831 and FR-A-2,405,985, and benzene alkylation products, in particular the polyalkylbenzenes obtained by alkylation of benzene with olefins containing a linear or branched long chain, in particular olefins containing 12 carbon atoms produced by the polymerization of propylene, such as those described, for example, in French Patent FR-A-2,446,849.

It is also possible to employ polydiorganosiloxane organic mixed polymers such as the polyoxyalkylene-polyorganosiloxane block copolymers, phosphoric esters (FR-A-2,372,203), trioctyl phosphate (FR-A-2,415,132), dialcoholic esters of dicarboxylic acids (U.S. Pat. No. 2,938,007) and cycloalkylbenzenes (FR-A-2,924,476).

The products of alkylation of benzene, of molecular weight greater than 200, in particular alkylbenzenes and polyalkylbenzenes, are the preferred organic plasticizers.

To prepare the compositions according to the present invention, the processing is carried out as described above and as further described and illustrated in the examples below. The starting point is, therefore, the production of a dough and it has been found that in order to prepare doughs containing more than 8% of water (by weight) it was advantageous for the dough to contain at least 0.08% of the polymer (F). Furthermore, to produce doughs containing 25% of water it was found that it was preferred to employ more than 0.25% of polymer (F) in the dough.

In order to further illustrate the present invention and the advantages thereof, the following specific examples are given, it being understood that same are intended only as illustrative and in nowise limitative.

EXAMPLE 1

The doughs (or mixtures I) A1 to A8 (see Table I) were first prepared according to the following procedure:

the oils $H_1$ and $H_2$ and the silica A 200 were first introduced into a turbine mixer. The mass was maintained powerfully stirred (200 revolutions per minute) until a homogeneous mass was obtained;

(ii) the hydroretainer (Aqua-Keep) or xanthan gum, or carboxymethyl cellulose and water were then added to the turbine mixer (according to the doughs A1 to A8 which were prepared). The masses thus obtained were then degassed (to expel the bubbles) for 2 minutes at 1.33 kPa (absolute pressure), were cooled to 25° C. and were stored in the absence of air. These doughs (or mixtures I) A1 to A8 were stored at 25° C. and their behavior over time after 2 months, 4 months and 6 months is reported in Table I.

This Table I indicated the percentages by weight of each constituent employed for each dough A1 to A8:

oil H1 was an $\alpha,\omega$-dihydroxypolydimethylsiloxane oil having a viscosity of 70,000 mPa.s at 25° C.;

oil H2 was an $\alpha,\omega$-dihydroxypolydimethylsiloxane oil having a viscosity of 14,000 mPa.s at 25° C.;

Aqua-Keep 10 SH.P was an alkali metal acrylate polymer marketed by the Norsolor Company;

the xanthan gum was that marketed by Rhône-Poulenc under the trademark Rhodopol 23;

the carboxymethyl cellulose, employed in the form of its sodium salt, was marketed by the Prolabo Company;

the silica A 200 was a pyrogenic silica of BET specific surface area of 200 m$^2$/g, marketed by the Degussa Company.

(v) 26.8 parts of oil H4, namely, an $\alpha,\omega$-trimethylsiloxypolydimethylsiloxane oil having a viscosity of 50 mPa.s at 25° C.

One of the doughs (mixtures I) A1 to A8 was introduced into 100 parts by weight of the mixture II, in such amount that the mixtures B1 to B8 which were obtained contained 0.15% of water. The incorporation of each dough A1 to A8 into 100 parts of mixtures II required approximately 10 minutes. 8 mixtures B1 to B8 were thus obtained, constituting 8 parts No. 1 (such as described above) of the compositions according to the present invention.

To effect the crosslinking of the mixtures B1 to B8, 5 parts (by weight) of the crosslinking system whose composition, by weight, was the following were added to 100 parts of these compositions:

(a) $\alpha,\omega$-trimethylsiloxypolydimethylsiloxane oil having a viscosity of 50 mPa.s at 25° C.: 80 parts;

(b) ethyl polysilicate, "Ethyl Silicate 40" trademark: 16 parts;

(c) dibutyltin dilaurate: 4 parts.

The period of time for the incorporation of the crosslinking system into the mixtures B1 to B8 was approximately 2 minutes.

It will be appreciated that these 5 parts of crosslinking system constitute the part No. 2 of the composition according to the present invention, such as described above.

The mixtures B1 to B8 were employed immediately (ts=0) after they were obtained, or after having been stored for two months (ts=2 months), that is to say, that the crosslinking system was added thereto immediately after they were obtained or after two months of storage. After the addition of the crosslinking system to the mixtures B1 to B8 the compositions C1 to C8 were obtained, of which the compositions C3 to C6 were those according to the present invention.

To evaluate the performances of such compositions C1 to C8, the latter were spread in the form of a layer 6 mm in thickness onto Teflon plaques. The layer of the

TABLE I

| | A1 | A2 | A3 | A4 | A5 | A6 | A7 | A8 |
|---|---|---|---|---|---|---|---|---|
| oil H1 | 85.5 | 78.25 | 85.45 | 78.125 | 65.50 | 65.25 | 78.125 | 78.125 |
| oil H2 | 7.25 | 6.5 | 7.25 | 6.5 | 6.5 | 6.5 | 6.5 | 6.5 |
| silica A 200 | 2.75 | 2.75 | 2.75 | 2.75 | 2.75 | 2.75 | 2.75 | 2.75 |
| Aqua-Keep 10 SH.P | — | — | 0.045 | 0.125 | 0.25 | 0.5 | — | — |
| xanthan gum | — | — | — | — | — | — | 0.125 | — |
| carboxymethylcellulose | — | — | — | — | — | — | — | 0.125 |
| water | 4.5 | 12.5 | 4.5 | 12.5 | 25 | 25 | 12.5 | 12.5 |
| water/hydroretainer ratio | — | — | 100 | 100 | 100 | 50 | 100 | 100 |
| Storage: | | | | | | | | |
| 2 months | S | D | S | S | S | S | D | D |
| 4 months | S | D | S | S | S | S | D | D |
| 6 months | S | D | S | S | slight | S | D | D |

S = stable
D = water demixing

EXAMPLE 2

A mixture II, such as described above, was prepared from the following constituents, by weight:

(i) 17.5 parts of oil H1;

(ii) 11.7 parts of oil H2;

(iii) 42.1 parts of ground quartz having a mean particle diameter of 10 microns;

(iv) 0.4 parts of oil H3, namely, an $\alpha,\omega$-dihydroxypolydimethylsiloxane oil having a viscosity of 80 mPa.s at 25° C.; and composition deposited on each plaque was converted into a rubbery strip. Measurements were made, on the one hand, of the time, to, in minutes, during which the composition could be handled (namely, the time during which it can be cast), and the Shore A hardness (SAH) after 24 hours of crosslinking.

All of the operations were carried out under nitrogen atmosphere. The results are reported in Table II below:

TABLE II

| | Compositions | | | | | | | |
|---|---|---|---|---|---|---|---|---|
| | C1 | C2 | C3 | C4 | C5 | C6 | C7 | C8 |
| For Ts = 0 | | | | | | | | |
| to | 86 | 91 | 80 | 82 | 69 | 74 | 108 | 124 |
| DSA (24 h) | 9 | 9.5 | 8.5 | 9 | 9 | 9 | 7 | 6 |
| For Ts = 2 months | | | | | | | | |
| to | 81 | 85 | 84 | 76 | 55 | 70 | D | D |
| DSA (24 h) | 8.5 | 9 | 9.5 | 9 | 9.5 | 9.5 | D | D |

D = demixing of water at the surface

EXAMPLE 3

A mixture II, designated mixture E, was prepared, comprising the following constituents:

(i) 100 parts of oil H2, namely, an α,ω-dihydroxypolydimethylsiloxane having a viscosity 14,000 mPa.s;

(ii) 70 parts of oil H5, namely, an α,ω-trimethylsiloxypolydimethylsiloxane having a viscosity 100 mPa.s; and (iii) 100 parts of calcium carbonate treated with stearic acid.

3 mixtures I, designated doughs F1 to F3, were prepared separately, the nature of their constituents and their amounts, by weight, being indicated in Table III below:

TABLE III

| Constituents of each dough | F1 | F2 | F3 |
|---|---|---|---|
| oil H2 | 45 | 45 | 45 |
| oil H6 | 45 | 45 | 45 |
| Silica A 200 | 2.5 | 2.5 | 2.5 |
| Aqua-Keep 10 SH.P | | 0.045 | 0.2 |
| TiO2 | 2.5 | 2.5 | 2.5 |
| Water | 4.5 | 4.5 | 20 |

The oil H2, the silica A 200 and the Aqua-Keep 10 SH.P were as described in Example 1.

The oil H6 was an α,ω-trimethylsiloxypolydimethylsiloxane having a viscosity of 1,000 mPa.s at 25° C.

The operating procedure for preparing the doughs F1 to F3 was identical with that of the doughs A1 to A8 of Example 1, the TiO2 being introduced before the water and the Aqua-Keep.

To 100 parts of the mixture E (or mixture II) were added, over approximately 10 minutes, X parts of the doughs F1, F2, F3 such as to obtain the mixtures G1, G2, G3 containing 0.15% of water.

Thus, the mixture G1 contained, by weight, 100 parts of the mixture E + 3.5 parts of the mixture F1;

the mixture G2 contained 100 parts of the mixture E + 3.5 parts of the mixture (dough) F2;

the mixture G3 contained 100 parts of the mixture E + 0.755 parts of the mixture F3.

To effect the crosslinking of the mixtures G1, G2 and G3, 5 parts of the crosslinking system described in Example 2 were added to 100 parts, by weight, of each of the former. The period of time for incorporation of the crosslinking system into the mixtures G1, G2 and G3 was approximately 2 minutes. Compositions according to the present invention C'1, C'2 and C'3 were thus obtained.

These compositions C'1, C'2 and C'3 were immediately spread in the form of a layer 6 mm in thickness onto Teflon plaques. The layer of the composition deposited on each plaque was converted into a rubbery strip.

The following parameters were measured:

(a) the time, to, in minutes, during which the composition was capable of being handled;

(b) the time, tm, at the end of which the Shore A hardness (SAH) was measurable;

(c) the SAH after 8 hours;

(d) the SAH after 24 hours.

The results are reported in Table IV below:

TABLE IV

| | Compositions | | |
|---|---|---|---|
| | C'1 | C'2 | C'3 |
| to (min) | 44 | 47 | 38 |
| tm | 6 h, 30 min | 6 h, 30 min | 5 h, 45 min |
| SAH 8 h | 8 | 7.5/8 | 7 |
| SAH 24 h | 13 | 13 | 14 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A two-component organopolysiloxane composition crosslinkable into elastomeric state, comprising:

(A) an α,ω-dihydroxypolydiorganosiloxane having a viscosity ranging from 50 to 1,000,000 mPa.s at 25° C.;

(B) an inorganic filler material;

(C) 0.05% to 0.5% by weight of the composition of water;

(D) a crosslinking agent which comprises (i) a silane of the formula $(R^2)_k Si(OR^1)_{4-k}$ in which the symbols $R^1$, which may be identical or different, are each a $C_1$–$C_{12}$ alkyl radical, a halogenated $C_1$–$C_{12}$ alkyl radical or a $C_3$–$C_8$ alkoxyalkylene radical, the symbol $R^2$ is a $C_1$–$C_{10}$ hydrocarbon radical and the symbol k is zero or one, or (ii) a product of partial hydrolysis of the above silane (i);

(E) a catalytically effective amount of a crosslinking catalyst; and (F) a hydroretaining amount of an alkali metal acrylate and/or methacrylate group polymer.

2. The organopolysiloxane composition as defined by claim 1, said polymer (F) comprising an alkali metal acrylate polymer prepared by polymerization of acrylic acid with an alkali metal acrylate in aqueous emulsion.

3. The organopolysiloxane composition as defined by claim 1, said polymer (F) comprising a sodium acrylate and/or methacrylate polymer.

4. The organopolysiloxane composition as defined by claim 1, comprising at least 0.001% by weight of polymer (F).

5. The organopolysiloxane composition as defined by claim 1, comprising:

(A) 100 parts by weight of at least one α,ω-dihydroxypolydiorganosiloxane having a viscosity ranging from 50 to 1,000,000 mPa.s at 25° C.;

(B) 5 to 125 parts by weight of at least one inorganic filler material;

(C) 0.05 to 0.5% by weight of water;

(D) 1 to 15 parts by weight of said crosslinking agent;

(E) a catalytically effective amount of a crosslinking catalyst; and (F) at least 0.001% by weight of said polymer (F).

6. The organopolysiloxane composition as defined by claim 5, said filler (B) comprising 30% to 70% by weight of a pyrogenic and/or precipitated silica having a specific surface area greater than 40 m$^2$/g.

7. The organopolysiloxane composition as defined by claim 1, comprising a tin catalyst (E).

8. The organopolysiloxane composition as defined by claim 1, comprising an amine catalyst (E).

9. The organopolysiloxane composition as defined by claim 1, further comprising a triorganosiloxypolydiorganosiloxane, an organic plasticizer, or an adhesion promoter, or mixture thereof.

10. The organopolysiloxane composition as defined by claim 1, one component comprising said catalyst (E) and the other component comprising said dihydroxypolydiorganosiloxane (A), at least a fraction of the filler material (B), the water (C) and the hydroretainer polymer (F).

11. The organopolysiloxane composition as defined by claim 1, in crosslinked elastomeric state.

12. A storage-stable organopolysiloxane dough comprising (A) at least one α,ω-dihydroxypolydiorganosiloxane having a viscosity ranging from 50 to 1,000,000 mPa.s at 25° C.; (B) an inorganic filler material; (C) from 8% to 35% by weight of water; and (F) a hydro-retaining amount of an alkali metal acrylate and/or methacrylate polymer.

13. The organopolysiloxane dough as defined by claim 12, comprising from 0.08% to 15% by weight of said alkali metal polymer (F).

* * * * *